(12) United States Patent
Terfloth et al.

(10) Patent No.: US 10,577,538 B2
(45) Date of Patent: Mar. 3, 2020

(54) METHOD FOR UTILIZING FINE-PARTICLE PEAT

(71) Applicant: Jowat AG, Detmold (DE)

(72) Inventors: Christian Terfloth, Detmold (DE); Christian Schmidt, Detmold (DE)

(73) Assignee: Jowat AG, Detmold (DE)

(*) Notice: Subject to any disclaimer, the term of this patent is extended or adjusted under 35 U.S.C. 154(b) by 386 days.

(21) Appl. No.: 15/329,717

(22) PCT Filed: Oct. 1, 2014

(86) PCT No.: PCT/EP2014/002670
§ 371 (c)(1),
(2) Date: Jan. 27, 2017

(87) PCT Pub. No.: WO2016/015741
PCT Pub. Date: Feb. 4, 2016

(65) Prior Publication Data
US 2017/0208751 A1 Jul. 27, 2017

(30) Foreign Application Priority Data

Jul. 28, 2014 (WO) .................. PCT/EP2014/002058

(51) Int. Cl.
| | | |
|---|---|---|
| *C09K 17/30* | (2006.01) | |
| *A01G 24/28* | (2018.01) | |
| *A01G 24/44* | (2018.01) | |
| *C09K 17/20* | (2006.01) | |

(52) U.S. Cl.
CPC .............. *C09K 17/30* (2013.01); *A01G 24/28* (2018.02); *A01G 24/44* (2018.02); *C09K 17/20* (2013.01)

(58) Field of Classification Search
USPC .................. 47/58.1 SC, 9, 59 S, DIG. 10, 74
See application file for complete search history.

(56) References Cited

U.S. PATENT DOCUMENTS

| | | | | | |
|---|---|---|---|---|---|
| 2,855,021 | A | * | 10/1958 | Hoppe | B29C 44/0461 156/78 |
| 3,616,573 | A | * | 11/1971 | Clifford | A01C 1/06 47/57.6 |
| 3,799,755 | A | * | 3/1974 | Rack | C05F 11/02 71/24 |
| 3,973,355 | A | * | 8/1976 | McKenzie | A01G 24/44 47/59 R |
| 4,023,308 | A | * | 5/1977 | Staby | A01G 9/00 47/79 |
| 4,034,508 | A | * | 7/1977 | Dedolph | A01H 4/001 47/84 |
| 4,175,355 | A | * | 11/1979 | Dedolph | A01G 24/60 47/64 |
| 6,678,996 | B1 | * | 1/2004 | Visser | A01G 24/00 47/59 S |
| 2005/0005518 | A1 | * | 1/2005 | Iseki | A01G 9/028 47/79 |
| 2006/0248795 | A1 | | 11/2006 | Langezaal et al. | |
| 2012/0121334 | A1 | * | 5/2012 | Hornaday | B09C 1/08 405/17 |
| 2014/0182199 | A1 | * | 7/2014 | Hempenius | A01C 1/042 47/56 |
| 2016/0219810 | A1 | * | 8/2016 | Erkkila | A01G 23/00 |

* cited by examiner

*Primary Examiner* — Andrea M Valenti
(74) *Attorney, Agent, or Firm* — Edward E. Sowers; Brannon Sowers & Cracraft PC

(57) ABSTRACT

The present invention relates to a method for utilizing fine-particle peat, in particular to a method for improving the stability of planting substrates.

9 Claims, No Drawings

METHOD FOR UTILIZING FINE-PARTICLE PEAT

CROSS-REFERENCES TO RELATED APPLICATIONS

This application is a National Stage filing of International Application PCT/EP 2014/002670, filed Oct. 1, 2014, entitled METHOD FOR UTILISING FINE-PARTICLE PEAT, claiming priority to PCT/EP 2014/002058 filed Jul. 28, 2014. The subject application claims priority to PCT/EP 2014/002670, and to PCT/EP 2014/002058 and incorporates all by reference herein, in their entirety.

BACKGROUND OF THE INVENTION

The present invention relates to the technical field of the consolidation of planting substrates and/or the particle enlargement of planting substrates, more particularly for the purpose of utilizing fine-particle peat.

More particularly, the present invention relates to a method for utilizing fine-particle peat, more particularly a method for improving the firmness of planting substrates.

The present invention additionally relates to a binder composition, more particularly for consolidating planting substrates.

The present invention further relates to the use of a binder composition for consolidating planting substrates, and also to the planting substrate obtainable in this way. The present invention relates, lastly, to a planting substrate which comprises a peat comprised substrate mixture and also a binder.

Peat is an organic sediment which is formed in moors in the absence of air through incomplete decomposition of dead plant substances. Among moors, a fundamental distinction may be made between low moors and high moors, with only the peat harvested from high moors being utilized for industrial and domestic purposes.

Peat forms the basis of the majority of planting or growing substrates and potting soils which are used in horticulture both for leisure and for commercial gain. Planting or growing substrates are mixtures of selected starting materials or base materials, such as peat, wood fibers, compost or else coir pith, for example. These mixtures are admixed with fertilizer and also, optionally, optimized with adjuvants. In this way it is possible to provide substrates or potting soils adapted to the specific requirements of the particular plants. The substrate mixtures or potting soils serve as root space for the horticultural plantings.

Various grades of peat are used for growing substrates, the composition of these grades being tailored to the specific requirements of the growing of different types of plant. As well as different kinds of peat, such as white peat and black peat, adjuvants such as coconut or wood fibers, fertilizers, minerals, and also clay, sand, lime or perlite are used for producing the substrates or potting soils.

There are various ways in which the various peat substrates can be mixed with the plant-specific adjuvants. Use of conveyor belt systems and drum mixing machines is commonplace for producing homogeneous mixtures.

White and black peats and also various sub-varieties of peat differ in their degree of decomposition and hence in the proportion of plant structure that is still perceptible. A further subdivision of the substrate mixtures comprising peats or peat constituents is made according to their density, which may be in the range from about 100 kg/m$^3$ to about 800 kg/m$^3$, and also according to the consistency and particle size. Grades which can be differentiated are very fine, fine, medium, coarse, and extra-coarse, possibly with further classification, such as fibrous, for example. Black peats, for example, are generally classified as fine or very fine. For white peats, conversely, particle sizes up to 10 mm are classed as fine or very fine, up to 25 mm as medium, and larger than 25 mm as coarse.

While peat is an outstanding basis for growing substrates of any kind, up to 40% of the cut peat cannot be used for producing growing substrates, especially for commercial horticulture, on account of its consistency, more particularly on account of a pronounced fine-particle nature of the peat. Relatively large aggregates and agglomerates of the peat fall apart on mechanical processing, and/or cannot be processed to homogeneous growing substrates with the other starting materials and/or adjuvants.

In commercial horticulture, plants are generally grown according to the following principle: the substrate mixture for plant growing is introduced alternatively into plant trays or planting pots or is pressed into shape in the form of what are called soil blocks. The plant trays used—often referred to for short as trays—can accommodate around 40 to 250 substrate plugs, as they are known, depending on construction. Substrate plugs are shaped bodies of growing substrate or planting substrate, which are filled into the plant trays or formed by filling of the substrate mixture into plant trays. Filling of trays is accomplished customarily by hand or using tray fillers, allowing different throughputs according to construction.

After a germination and growth period determined by the nature of the plant, the plant together with its root system and surrounding substrate plug is transferred to a planting vessel of the next size up. Apparent here are substantial differences between individual peats or substrates. Certain substrates afford high firmness, meaning that the shape of the plugs is retained when the plants are being transplanted. With other mixtures, this is not the case. During transplantation, the substrate parts from the root system—in other words, only the plant can be transplanted, a feature generally unwanted by the commercial end user.

Since not all solid or dimensionally stable peat mixtures are of equal usefulness as substrates for all plants, technical remedies are required in the case of loose peat mixtures. One remedy is provided by what are called paper plug machines. These machines surround a defined amount of planting substrate with a paper or nonwoven material in order to maintain the plug in shape mechanically. After they have been surrounded, the paper plugs are inserted into the trays manually or by means of robots. Disadvantages associated with this method are the performance of an intermediate step, the capital investments in the form of machinery and paper material required, and also additional time taken.

In commercial horticulture, therefore, it is desirable to obtain any peat or substrate mixture in a form which makes the use of growing aids such as paper plugs unnecessary and allows pot, tray or soil-block application.

In the prior art, therefore, there has been no lack of attempts to consolidate growing substrates based on peat. Thus EP 0 971 015 A1 describes the use of a water-isocyanate prepolymer emulsion for consolidating planting substrates. The emulsion is prepared by mixing an isocyanate prepolymer with water and must thereafter be further-processed within a few minutes, by mixing with the planting substrate, in order to produce the desired shaped bodies.

Moreover, US 2006/0248795 A1 describes a method for producing a consolidated growing substrate wherein a substrate mixture is admixed with a thermoplastic, biodegradable binder, the binder being subsequently melted by supply of heat. As a result it is possible to produce shaped bodies based on a growing substrate. The use of biodegradable hotmelt adhesives is complicated and costly in terms of apparatus and energy, however, making the method neither economically nor environmentally rational to implement.

EP 1 330 949 A1 describes a method and apparatus for producing shaped bodies consisting of planting substrate and of consolidating agent combined with said substrate. In this case, isocyanate prepolymers are mixed with water to form an emulsion which is then added to a planting substrate. The mixture is subsequently introduced into matrices and compacted, giving shaped bodies.

WO 00/60922A1 as well, lastly, describes a method for producing shaped bodies based on isocyanate prepolymers and planting substrates.

While the aforementioned methods do make it possible to consolidate planting or growing substrates, the sole products are shaped bodies—in other words, it is not possible to custom-tailor the particle size of the peat. For many systems, moreover, there is no biodegradability, which limits the usefulness of the methods.

In the case of the prior-art methods, furthermore, it has proven disadvantageous that oftentimes they must be carried out at elevated temperatures or feature only extremely short working times before the setting of the binder.

It is an object of the present invention, therefore, to provide consolidated planting substrates and also planting or growing substrates with which the problems and disadvantages outlined above, occurring in connection with the prior art, are at least largely avoided or else are at least diminished.

BRIEF SUMMARY OF THE INVENTION

It is an object of the present invention in particular to provide a method for utilizing fine-particle peat, more particularly a method for improving the firmness of planting substrates, that not only allows the particle size of the planting substrates to be adjusted, and consolidated planting substrates produced, but can also be carried out in a manner which is favorable both environmentally and economically.

It is an object of the present invention, furthermore, to provide consolidated planting substrates which are suitable for the mechanical transplanting of the seedlings or plants and which are significantly easier to produce and to handle than the existing prior-art systems.

The objects outlined above are achieved in accordance with the invention by the method provided including further advantageous developments and embodiments thereof.

A further subject of the present invention is a binder composition as provided below including further advantageous developments and embodiments of the binder composition.

Yet another subject of the present invention is the use of the binder composition of the invention for consolidating planting substrates as described herein.

A further subject of the present invention described is a planting substrate. Further advantageous developments and embodiments of the planting substrate of the invention are similarly described.

A further subject of the present invention, lastly, is the use of a binder composition for producing a planting substrate.

It will be readily understood that any values, numbers, and ranges recited hereinbelow shall not be construed as limiting the respective value, number, and range recitations; the skilled person will appreciate, rather, that in a particular case or for a particular application, departures from the recited ranges and particulars are possible without departing the realm of the present invention.

Furthermore, any value/parameter particulars or the like that are recited hereinbelow may in principle be determined/quantified using standard/standardized or explicitly recited methods of determination or else using methods of determination that are per se familiar to those skilled in this field.

It will be appreciated that particular embodiments, versions or the like described only in connection with one aspect of the invention shall also be valid mutatis mutandis below in relation to the other aspects of the invention, without any need for express mention of this fact.

Moreover, all the hereinbelow-stated relative or percentage, more particularly weight-based, recitations of quantity should be understood as having to be selected by the skilled person within the context of the present invention such that the sum total of the respective ingredients, adjuvants or auxiliaries or the like adds up in each case to 100% or 100 wt %. This, however, is self-evident to the skilled person.

This having been made clear, the present invention is described in more detail below.

DETAILED DESCRIPTION OF THE INVENTION

Subject matter of the present invention—according to a first aspect—is therefore a method for utilizing fine-particle peat, more particularly a method for improving the firmness of planting substrates, in which a substrate mixture comprising peat is admixed with at least one binder composition comprising at least one binder, and the binder is subsequently allowed to set.

In the context of the present invention, therefore, from fine-particle peat particles and other constituents of planting and growing substrates, larger agglomerates of the substrates are obtained. In particular, in the context of the present invention, networks based on the binder used can be produced between the individual constituents of the substrate, on the one hand enabling controlled adjustment of the substrate particle size and on the other hand enabling the formation of highly porous, water-absorbing shaped bodies.

A substrate for the purposes of the present invention refers to a nutrient medium suitable for the growing of plants. Substrates for the purposes of the present invention are also referred to synonymously as growing or planting substrates.

A binder for the purposes of the present invention means a substance or substance mixture which is suitable for developing networks between the individual constituents of the planting substrates. The effect of the binder in particular is to allow the individual constituents of the growing substrates to bond or adhere to one another.

Fine-particle peat is intended for the purposes of the present invention to refer to peat having particle sizes of less than 10 mm, more particularly less than 5 mm, preferably less than 4 mm. Peats with these particle sizes are generally suitable only for specialty applications as growing or planting substrates in commercial horticulture, and are difficult if not impossible to process to homogeneous planting or growing substrates with the other constituents, such as starting materials and adjuvants, for example. Broad application was therefore hitherto impossible in horticulture for these size fractions of the peat.

In the context of the present invention, fine peats and peat fractions are endowed with the firmness necessary for manual or mechanical transplanting of the seedlings. The binder does not adversely affect the water absorption of the substrate mixture and has no effect on plant growth; for example, rooting is unaffected. The binder used is preferably compostable industrially or generally biodegradable. Sticking to the walls of the planting pots or trays, which are normally made of plastic, does not occur, meaning that the substrate plugs can be transplanted or removed without residue.

The binder or binder composition can be incorporated at the premises of the substrate mixture manufacturer, using existing plant and machine technology, without large capital expenditure. For example, the binder or binder composition can be incorporated by means of a mixing drum or by the sprayed application of the binder using nozzles during the transport of the substrate mixture over conveyor belts.

In the context of the present invention, accordingly, it is possible for the particle size of the substrate mixture to be increased during implementation of the method. This is accomplished by the particles of the substrate mixture being joined by the binder to form larger agglomerates.

In general the particles of the substrate mixture form a network with the set binder. The formation of such networks allows, on the one hand, a controlled adjustment of the particle size of the individual agglomerates of the planting or growing substrates, and also, on the other hand, the provision of highly porous shaped bodies. Network formation allows the seedlings to be transplanted mechanically or manually with the substrate plugs into larger plant trays or plant vessels.

A plant tray for the purposes of the present invention refers to planting pallets for the growing of plants, more particularly of seedlings, which consist of a multiplicity of planting vessels joined to one another.

The porous, pervious network which forms in general from the particles of the substrate mixture and also the set binder does not—as already observed above—hinder the root growth of the seedlings. Networks are resistant to moderate mechanical loads, of the kind occurring, for example, when the seedlings are transplanted into larger plant trays, but the individual agglomerates can nevertheless be parted from one another and singularized without problems.

Particularly good results in the context of the present invention are obtained if the mixture of planting substrate and binder composition is transferred to a matrix, more particularly into plant trays, and the binder is subsequently allowed to set.

For the purposes of the present invention, a matrix here is a mold into which the mixture of planting substrate and binder composition is introduced. By simply allowing the binder to set, as for example by removing the dispersion medium or solvent when using dispersion-based or solvent-based adhesives as binders, it is possible in the context of the present invention to obtain high-porosity, water-absorbent, three-dimensional networks in the form of shaped bodies which are outstandingly suitable for the growing of plants or seedlings.

According to one particularly preferred embodiment of the present invention, the method for utilizing fine-particle peat, more particularly the method for improving the firmness of planting substrates, is carried out such that in a first method step (a) a substrate mixture comprising peat is admixed with at least one binder composition, optionally in a subsequent method step (b) the mixture of planting substrate and binder composition is transferred to a matrix, more particularly into plant trays, and in a further subsequent method step (c) the binder is subsequently allowed to set.

If the mixture of planting substrate and binder composition is transferred to a matrix in the context of the present invention, particularly good results are obtained if the transferring of the mixture of binder composition and planting substrate, more particularly in method step (b), is carried out with application of pressure or without pressure, preferably without pressure.

In the context of the present invention, accordingly, high-porosity, three-dimensional networks in the form of shaped bodies can be obtained without any need for the substrate to be compressed, which would lead to significantly lower porosity.

Generally, in the context of the present invention, the planting substrate is admixed with the binder composition in an extruder, in a mixing drum and/or by spraying of the planting substrate with the binder composition. Particularly good results are obtained in this context if the planting substrate is first sprayed with the binder composition and subsequently there is further commixing of the mixture, more particularly in a mixing drum. The method of the invention has the advantage that such mixing drums and/or spraying equipment are oftentimes already present at the premises of the manufacturers of planting or growing substrates. The method of the invention can therefore be carried out readily on the existing apparatus of the substrate manufacturers, so that the latter do not bear any further or additional capital investments or costs or are required where appropriate to modify only slightly the existing plant and machinery. In the manner described above, it is possible to produce three-dimensional shaped bodies in plant trays, and also coarse-grained planting or growing substrates, such as potting soil, for example.

The method of the invention is carried out generally at room temperature or ambient temperature. In the context of the present invention, consequently, it is unnecessary to heat the binder composition, the binder or the substrate mixture in order to obtain a permanent joining of substrate and binder.

Particularly good results are obtained in the context of the present invention if the binder composition is based on a dispersion or solution. For the purposes of the present invention, it is also possible to use not only one binder, but rather binder mixtures.

If the binder composition is based on a dispersion or solution, the binder composition customarily comprises at least one dispersion medium or solvent. In this case the dispersion medium or solvent may be organic-based and/or water-based, preferably water-based. With particular preference the dispersion medium or solvent is water. Using water has the advantage that there is no need for the dispersion medium or solvent to be removed, at cost and inconvenience, in order to prevent harm to the environment and particularly to the plants to be cultivated, and to comply with statutory impositions. Furthermore, water as dispersion medium or solvent is rapidly absorbed by the peat fraction of the substrate mixture, resulting in a rapid and permanent join between binder and the particles of the planting substrate.

Depending on the nature of processing, more particularly of mechanical processing, the binder composition may be added in concentrated form or dilute. The maximum possible dilution is dependent very heavily on the desired mixing system and on the nature of the planting substrate. In tests, the addition of 2 vol % to 1 $m^3$ of peat has proven advantageous.

For the purposes of the present invention it has proven advantageous if the binder composition comprises the dispersion medium or solvent in amounts of 60 to 99.9 wt %, more particularly 75 to 99.8 wt %, preferably 85 to 99.5 wt %, more preferably 90 to 99.2 wt %, very preferably 95 to 99 wt %, based on the binder composition. In the context of the present invention, accordingly, preference is given to using highly dilute dispersions or solutions of binders, meaning that the solids content of the binder composition is extremely low, thus ensuring high porosity on the part of the planting substrate.

In the context of the present invention it has emerged as being advantageous, furthermore, if the binder composition has a solids content of 0.01 to 40 wt %, more particularly 0.2 to 25 wt %, preferably 0.5 to 15 wt %, more preferably 0.8 to 10 wt %, very preferably 1 to 5 wt %, based on the binder composition. The term "solids content" is intended for the purposes of the present invention to refer to the weight fraction of the binder composition that remains after removal of all dispersion media and/or solvents.

If the binder composition is formed on the basis of a dispersion or solution, then the binder composition customarily comprises at least one adhesive based on an adhesive polymer, more particularly an organic adhesive polymer, as binder. Particularly good results are obtained in this case if the adhesive is a dispersion-based adhesive. Dispersion-based adhesives are customarily nonreactive adhesives which set and become tacky by a purely physical pathway, through removal of the dispersion medium and/or solvent.

Customarily, for the purposes of the present invention, the adhesive or the adhesive polymer is selected from the group of polyurethanes (PU), polylactides (PLA), acrylates, chloroprene, vinyl acetate-ethylene copolymers (VAE), polyvinyl alcohols (PVOH), and polyvinyl acetates (PVAc), more particularly vinyl acetate-ethylene copolymers (VAE), polylactides (PLA) and/or polyurethanes (PU), preferably polylactides (PLA) and/or polyurethanes (PU), more preferably polyurethanes (PU).

As far as the amount of adhesive in the binder composition used in accordance with the invention is concerned, it may of course vary within wide ranges. Particularly good results in the context of the present invention are obtained, however, if the binder composition comprises the adhesive in amounts of 0.05 to 40 wt %, more particularly 0.15 to 25 wt %, preferably 0.3 to 15 wt %, more preferably 0.5 to 10 wt %, very preferably 0.5 to 5 wt %, based on the binder composition.

Provision may be made for the purposes of the present invention, moreover, for the binder composition to have at least one additive selected from the group of rheology modifiers, viscosity regulators, thickeners, and also mixtures and combinations thereof. Surprisingly, through controlled selection of the aforementioned components, it is possible to improve decisively the development of firmness and also the ultimate firmness of the consolidated planting substrates, with the binder composition, more particularly the binder dispersion or binder solution, still remaining at low viscosity, more particularly sprayable. Furthermore, the use of the aforementioned components based on natural and/or modified natural products further improves the biodegradability of the binder.

If the binder composition has at least one additive selected from the group of rheology modifiers, viscosity regulators, thickeners, and also mixtures thereof, in combination, it has been found appropriate for the additive to be selected from the group of metal soaps, modified fat derivatives, starches, more particularly modified starches, celluloses, more particularly modified celluloses, preferably hydroxyethylcellulose, carboxymethylcellulose, hydroxylpropylmethylcellulose, hydroxypropylcellulose, ethylhydroxyethylcellulose, polyvinyl alcohols, poly(meth)acrylates, polyacrylamides, polyvinylpyrrolidone, polyethylene glycols, polyamides, and also mixtures and combinations thereof.

Particularly good results are obtained if the additive is selected from starches and/or celluloses, preferably modified starches and/or modified celluloses, more preferably cold-water-soluble starches. Cold-water-soluble starches swell or dissolve even in cold water. Raising the temperature or supplying energy is unnecessary to obtain dispersions or solutions of cold-water-soluble starch. Modified starches are obtained from natural starches by physical, enzymatic or chemical reaction in order to deliberately modify properties of the starch, such as the swellability in cold solution or dispersion media, for example, and also an improvement in the resistance toward heat, cold or changes in pH. Physically modified starch is obtainable, for example, by heating of native starch, while chemically modified starch is obtained, for example, by reaction of natural starch with acids or alkalis or by esterification, using anhydrides or phosphates, for example.

In the course of the applicant's investigations it has surprisingly emerged that the addition of the aforementioned additives to the binder composition used in accordance with the invention does not adversely affect the viscosity of the binder composition within wide ranges, in other words in spite of a greater fraction of rheology modifiers, viscosity regulators and/or thickeners, the mixture remains of low viscosity. This is the case particularly on addition of modified starches, especially cold-water-soluble starches. It has been found more particularly that a combination of polyurethane dispersions in combination with cold-water-soluble starches leads to an increase in firmness that is above-average, exhibits low viscosities, being more particularly sprayable, and can be diluted with water in virtually any proportions.

The binder compositions used have increased initial firmness, rapid development of firmness and a superior ultimate firmness on the part of the planting substrates.

A further advantage of starches, such as modified starches, for example, is that they are biodegradable and industrially compostable, in other words, the use of starches in the binder composition used in accordance with the invention increases considerably the biodegradability of the binder composition. For polyurethane dispersions—without additization—it is possible after 90 days to verify degradation of up to 74% or more—in other words, a combination of polyurethane dispersions and biodegradable additives leads to biodegradable and industrially compostable binders. Binder compositions based on polylactides and starches are compostable rapidly under industrial conditions, owing to the usual biodegradability of the polylactides.

If the binder composition has an additive from the group of rheology modifiers, viscosity regulators, thickeners, and also mixtures and combinations thereof, the amount of the additive may vary within wide ranges. For the purposes of the present invention, however, particularly good results are obtained if the binder composition comprises the additive in amounts of 0.05 to 30 wt %, more particularly 0.02 to 20 wt %, preferably 0.1 to 10 wt %, more preferably 0.3 to 5 wt %, very preferably 0.5 to 3 wt %, based on the binder composition.

The ratio of adhesive to additive selected from the group of rheology modifiers, viscosity regulators, thickeners, and also mixtures and combinations thereof may also vary within wide ranges in the context of the invention. It has emerged as being particularly advantageous, however, if the binder composition comprises the adhesive and the additive in a weight-based ratio of 5:1 to 1:5, more particularly 4:1 to 1:3, preferably 3.5:1 to 1:2, more preferably 3:1 to 1:1.5, very preferably 2.5:1 to 1:1, based on the solids content of the binder composition. In the aforementioned ratios of adhesive to additive, particularly good initial firmnesses and ultimate firmnesses of the planting substrates are obtained.

Provision may also be made in the context of the present invention for the binder composition to further comprise at least one further additive and/or at least one further auxiliary.

If the binder composition comprises further additives and/or auxiliaries, then it has been found appropriate if the further additive and/or further auxiliary is selected from the group of dispersing assistants, emulsifiers, wetting agents, fillers, defoamers, dyes, colorants, yellowing inhibitors, antioxidants, stabilizers, preservatives, UV absorbers, UV stabilizers, flow control agents, pH modifiers, protective colloids, and also mixtures and combinations thereof. These are customary auxiliary additives or auxiliaries which the binder composition may comprise in amounts of 0.01 to 25 wt %, more particularly 0.01 to 15 wt %, preferably 0.1 to 10 wt %, more preferably 0.5 to 10 wt %, based on the binder composition.

According to one particular embodiment of the present invention, the binder composition has a pH in the range from 4.0 to 10.5, more particularly 5.0 to 10.0, preferably 6.0 to 9.5, more preferably 7.0 to 9.3, very preferably 7.5 to 9.0.

The binder composition customarily has a Brookfield viscosity at 20° C. in the range from 10 to 2500 mPas, more particularly 20 to 1500 mPas, preferably 50 to 1000 mPas, more preferably 70 to 800 mPas, very preferably 90 to 600 mPas, especially preferably 100 to 400 mPas. Provision may likewise be made for the purposes of the present invention for the binder composition to be sprayable.

With viscosities in the aforementioned range, a broad applicability is ensured for the binder compositions used in accordance with the invention, with the binder compositions used in accordance with the invention being also customarily suitable for spray application, meaning particularly uniform wetting of the planting substrates. Binder compositions with viscosities in the aforementioned range can be operated by the manufacturers of growing or planting substrates using customary machinery and apparatus, which, furthermore, is generally already integrated into the plant in question, i.e., is already being utilized by the manufacturers. Incorporation of the binder or binder composition at the premises of the manufacturer of the substrate mixtures takes place, accordingly, without great cost and complexity, with existing plant and machine technology and without major capital investment.

A further subject of the present invention—according to a second aspect of the present invention—is a binder composition, more particularly in the form of a solution or dispersion, for consolidating planting substrates, wherein the binder composition comprises
(a) at least one solvent or dispersion medium,
(b) at least one adhesive, and
(c) at least one additive selected from the group of rheology modifiers, viscosity regulators, thickeners, and also mixtures and combinations thereof.

With the binder composition of the invention, in the context of the present invention, particularly firm adhesive bonds, more particularly especially high firmnesses on the part of the planting substrates, are achieved in conjunction with good initial firmness and ultimate firmness.

As far as the viscosity of the binder composition is concerned, it may of course vary within wide ranges. Particularly good results are obtained in the context of the present invention, however, if the binder composition has at 20° C. a Brookfield viscosity in the range from 10 to 2500 mPas, more particularly 20 to 1500 mPas, preferably 50 to 1000 mPas, more preferably to 800 mPas, very preferably 90 to 600 mPas, especially preferably 100 to 400 mPas. As already mentioned above, a viscosity of the binder composition within the aforementioned ranges ensures universal usefulness of the binder composition of the invention.

In general, in the context of the present invention, the binder composition is sprayable.

According to one preferred embodiment, the binder composition has a weight-based ratio of adhesive (b) to additive (c) in the range from 5:1 to 1:5, more particularly 4:1 to 1:3, preferably 3.5:1 to 1:2, more preferably 3:1 to 1:1.5, very preferably 2.5:1 to 1:1, based on the solids content of the binder composition. Particularly within the aforementioned quantity ratios, a synergistic effect is observed between adhesive and additive that leads, when using small amounts of adhesive and additive, to a high firmness of the planting substrates, more particularly to high initial and ultimate firmnesses and also a high development of firmness, but without adversely affecting plant growth and rooting.

The solvent or dispersion medium (a) used for the binder composition of the invention may be organic-based and/or water-based. Preferably, however, for the purposes of the present invention, a water-based dispersion medium or solvent or (a) is used, it being particularly preferred if the solvent or dispersion medium (a) is water. The use of water as solvent avoids the costly and inconvenient recycling that is customary in the case of organic solvents, more particularly the recovery, collection, and costly disposal of the solvent. Furthermore, the water is usually easily absorbed by the highly water-absorbent peat constituent, and so the binder rapidly develops its crosslinking effect.

In the context of the present invention it has further proven advantageous if the binder composition comprises the dispersion medium or solvent (a) in amounts of 60 to 99.9 wt %, more particularly 75 to 99.8 wt %, preferably 85 to 99.5 wt %, more preferably 90 to 99.2 wt %, very preferably 95 to 99 wt %, based on the binder composition. For the purposes of the present invention, therefore, binder compositions with only a very low solids content are employed.

As far as the solids content of the binder composition is concerned, it may vary within wide ranges.

Particularly good results in the context of the present invention are obtained, however, if the binder composition has a solids content of 0.01 to 40 wt %, more particularly 0.2 to 25 wt %, preferably 0.5 to 15 wt %, more preferably 0.8 to 10 wt %, very preferably 1 to 5 wt %, based on the binder composition.

For the purposes of the present invention, particularly good results are obtained if the adhesive (b) is selected from the group of polyurethanes (PU), polylactides (PLA), acrylates, chloroprene, vinyl acetate-ethylene copolymers (VAE), polyvinyl alcohols (PVOH), and polyvinyl acetates (PVAc), more particularly vinyl acetate-ethylene copolymers (VAE), polylactides (PLA) and/or polyurethanes (PU), preferably polylactides (PLA) and/or polyurethanes (PU), preferably polyurethanes (PU).

As far as the amount of the adhesive (b) in the binder composition is concerned, it may vary within wide ranges. It has been found appropriate, however, if the binder composition comprises the adhesive in amounts of 0.05 to 30 wt %, more particularly 0.02 to 20 wt %, preferably 0.1 to 15 wt %, more preferably 0.3 to 10 wt %, very preferably 0.5 to 5 wt %, based on the binder composition.

According to one preferred embodiment of the present invention, the additive (c) is selected from the group of metal soaps, modified fat derivatives, starches, more particularly modified starches, celluloses, more particularly modified celluloses, preferably hydroxyethylcellulose, carboxymethylcellulose, hydroxypropylmethylcellulose, hydroxypropylcellulose, ethylhydroxyethylcellulose, polyvinyl alcohols, poly(meth)acrylates, polyacrylamides, polyvinylpyrrolidone, polyethylene glycols, polyamides, and also mixtures and combinations thereof. It is particularly preferred if the additive (c) is selected from starches and/or celluloses, preferably modified starches and/or modified celluloses, more preferably cold-water-soluble starches.

Furthermore, in the context of the present invention, particularly good results are obtained if the binder composition comprises the additive (c) in particular amounts. It has proven advantageous here if the binder composition comprises the additive (c) in amounts of 0.05 to 30 wt %, more particularly 0.02 to 20 wt %, preferably 0.1 to 10 wt %, more preferably 0.3 to 5 wt %, very preferably 0.5 to 3 wt %, based on the binder composition.

In general, moreover, the binder composition comprises at least one further additive and/or at least one further auxiliary (d).

If the binder composition comprises a further additive and/or a further auxiliary (d), it has proven advantageous if the further additive and/or the further auxiliary (d) is selected from the group of dispersing assistants, emulsifiers, wetting agents, fillers, defoamers, dyes, colorants, yellowing inhibitors, antioxidants, stabilizers, preservatives, UV absorbers, UV stabilizers, flow control agents, pH modifiers, protective colloids, and also mixtures and combinations thereof.

According to one particular embodiment of the present invention, the binder composition is in the form of a binder concentrate, which is supplied to the user and mixed not until immediately prior to application with further dispersion medium and/or solvent, in order to obtain the use concentration. In this way, storage and transport costs are minimized, since significantly less substance must be conveyed and stored.

If the binder composition is in the form of a binder concentrate, the binder composition comprises the dispersion medium or solvent customarily in amounts of 10 to 90 wt %, more particularly 30 to 90 wt %, preferably 40 to 85 wt %, more preferably 50 to 80 wt %, very preferably 60 to 75 wt %, based on the binder composition.

If the binder composition of the invention is in the form of a binder concentrate, the binder composition customarily has a solids content of 10 to 90 wt %, more particularly 10 to 70 wt %, preferably 15 to 60 wt %, more preferably 20 to 50 wt %, very preferably 25 to 40 wt %, based on the binder composition.

With the aforementioned levels of solvent and/or dispersion medium and also of solids, storage-stable binder concentrates are provided which can be diluted almost infinitely prior to application and which themselves, as concentrates, are still sprayable.

Furthermore, in the event that the binder composition of the invention is in the form of a binder concentrate, the binder comprises the adhesive (b) in amounts of 10 to 90 wt %, more particularly 12 to 70 wt %, preferably 12 to 50 wt %, more preferably 14 to 35 wt %, very preferably 15 to 25 wt %, based on the binder composition.

As far, in turn, as the fraction of the additive (c) in the binder composition of the invention is concerned in the event that the binder composition takes the form of a binder concentrate, this fraction may of course vary within wide ranges. It has proven advantageous, however, if the binder concentrate comprises the additive (c) in amounts of 6 to 70 wt %, more particularly 8 to 45 wt %, preferably 8 to 35 wt %, more preferably 10 to 25 wt %, very preferably 10 to 15 wt %, based on the binder composition.

If the binder composition is present as concentrate, the viscosities of the concentrate are usually different from those of the ready-to-apply binder. In general the binder composition—where the binder composition takes the form of a binder concentrate—has a Brookfield viscosity at 20° C. in the range from 50 to 20 000 mPas, more particularly 100 to 10 000 mPas, preferably 200 to 5000 mPas. In the stated viscosity ranges, the binder composition of the invention is sprayable, at least in the lower viscosity range, and can be processed outstandingly and diluted in a targeted way over the whole of the viscosity range.

Customarily, the binder composition—irrespective of whether it is present in diluted form or as a concentrate—has a pH in the range from 4.0 to 10.5, more particularly 5.0 to 10.0, preferably 6.0 to 9.5, more preferably 7.0 to 9.3, very preferably 7.5 to 9.0.

For further details regarding the binder composition of the invention, reference may be made to the above observations concerning the method of the invention, which apply correspondingly in relation to the binder composition of the invention.

A further subject of the present invention in turn—according to a third aspect of the present invention—is the use of the above-described binder composition for utilizing fine-particle peat, more particularly for consolidating planting substrates.

For further details concerning this aspect of the invention, reference may be made to the above observations concerning the other aspects of the invention, which apply correspondingly in relation to the use according to the invention.

A further subject of the present invention in turn—according to a fourth aspect of the present invention—is a planting substrate which is obtainable with the method of the invention.

Peat substrates customarily possess a residual moisture content of around 50% to 60%. With the addition of the binder composition, the moisture fraction is customarily increased further. The peat may subsequently be dried back somewhat, although usually this takes place not at the premises of the substrate manufacturer but instead only within the commercial horticulture. In principle the moisture fraction in a plug used for growing ought not to be below 50%.

For further aspects relating to this aspect of the invention, reference may be made to the above observations concerning the other aspects of the invention, which apply correspondingly in relation to the planting substrate of the invention.

A further subject of the present invention in turn—according to a fifth aspect of the present invention—is a planting substrate comprising a peat-comprising substrate mixture and at least one set binder.

The planting substrate customarily comprises the set binder in amounts of 0.5 to 10 wt %, more particularly 0.8 to 7 wt %, preferably 1 to 5 wt %, based on the planting substrate.

According to one particular embodiment of the present invention, the planting substrate has particle sizes in the range from 1 to 40 mm, more particularly 2 to 35 mm, preferably 3 to 30 mm. The aforementioned particle sizes of the planting substrate relate to the particle sizes after treatment with the binder or the binder composition; in other words, the aforementioned particle sizes relate to the resulting agglomerates of the planting substrate. The size of the substrate particles can be determined by customary methods, as for example by sieve analysis, or optical methods, such as dynamic image analysis.

The substrate mixture used for producing the planting substrate of the invention customarily has at least one fine-particle peat. In this case it may be that the fine-particle peat has particle sizes in the range from 0.01 to 5 mm, more particularly 0.05 to 4 mm, preferably 0.1 to 4 mm. Peats having the aforementioned particle sizes cannot usually be used for producing homogeneous planting or growing substrates, since homogeneous mixing with the other constituents of the substrates is not possible, and such substrate mixtures also do not have the necessary firmness in order to ensure mechanical transplanting of seedlings into plant trays.

For further details regarding the planting substrate of the invention, reference may be made to the observations concerning the other aspects of the invention, which apply correspondingly in relation to the planting substrate of the invention.

A further subject of the present invention in turn, lastly, according to a sixth aspect of the present invention, is the use of a binder composition, more particularly as described above, for producing the planting substrate described above.

For further details in relation to the use according to the invention, reference may be made to the observations concerning the other aspects of the invention, which apply correspondingly in relation to the use according to the invention.

Working Examples

On the laboratory scale, the consolidation quality of various binders for peat substrates was tested as follows:
1. Preparation of Binder Concentrates The following binder concentrates were prepared, based on aqueous dispersions of vinyl acetate-ethylene copolymers (VAE) and polyurethane polymers (PU), with a solids content of 20 to 50 wt %, based on the binder concentrate:
VAE Dispersion
95 wt % VAE dispersion (Mowilith DM 105 from Celanese Emulsions)
4.8 wt % plasticizer (triacetin)
0.2 wt % preservative (Acticide LA 0614 from Thor Chemie)
PU Dispersion
50 wt % PU dispersion (Dispercoll U53 from Bayer Material Science)
49.8 wt % cold-water-soluble starch (Tackidex 036S from Roquette, 28.5% strength solution)
0.2 wt % preservative (Acticide LA 0614 from Thor Chemie)
2. Production and Investigation of the Consolidated Planting Substrate The binder concentrates prepared under 1.) were diluted with water in different proportions, giving mixtures having ratios of binder concentrate to water of 1:5, 1:10, and 1:15.

18 g of each of the resultant binder compositions were transferred to commercial spraying bottles and applied by spraying to a total amount of 10 g of peat substrate mixture. The water/peat mixture obtained in this way was transferred to a planting vessel (tray) and left to rest for 48 hours. After 48 hours, the firmness of the peat was evaluated on extraction from the tray and also in a dropping experiment from a height of around 25 cm onto the laboratory bench top. If the plug broke apart on extraction or broke up into individual pieces on impact on the bench top, the firmness was inadequate.

For comparison, further experiments were conducted with mixtures of 18 g of water and 10 g of peat.
VAE Dispersion
Dilution 1:5: sprayable
  drop test failed
  no residue-free parting from the plant tray
Dilution 1:10: sprayable
  drop test passed
  virtually residue-free parting from the plant tray
Dilution 1:15: sprayable
  drop test failed
  residue-free parting from the plant tray
PU Dispersion
Dilution 1:5: sprayable
  drop test passed
  residue-free parting from the plant tray
Dilution 1:10: sprayable
  drop test passed
  residue-free parting from the plant tray
Dilution 1:15: sprayable
  drop test passed
  residue-free parting from the plant tray Comparable results were also obtainable with binder compositions based on polylactides (PLA), acrylates, chloroprene, polyvinyl alcohols (PVOH) and polyvinyl acetates (PVAc), optionally with addition of rheology modifiers, such as starch, for example.
Peat/Water Mixture (Comparative)
No drop test could be carried out, since the substrate plug breaks apart as early as on removal from the plant tray.

The invention claimed is:
1. A method for improving the firmness and/or stability of planting substrates on the basis of fine-particle peat,
  wherein the method comprises the following steps:
  (i) a substrate mixture comprising peat is admixed with at least one binder composition comprising at least one binder, wherein the binder composition is formed on the basis of a dispersion or solution, with the dispersion medium or solvent being water, and wherein the binder composition comprises at least one dispersion-based adhesive based on an organic adhesive polymer, wherein the adhesive polymer is selected from the group consisting of polyurethanes (PUs), polylactides (PLAs), acrylates, chloroprene, vinyl acetate-ethylene copolymers (VAEs), polyvinyl alcohols (PVOHs), and polyvinyl acetates (PVAcs), and wherein the binder composition has a solids content in the range of from 0.2 to 25 wt %, based on the binder composition, and a Brookfield viscosity at 20° C. in the range of from 20 to 1,500 mPas; and
  (ii) the binder is subsequently allowed to set.
2. The method as claimed in claim 1,
  wherein the mixture of planting substrate and binder composition is transferred to a matrix and the binder is subsequently allowed to set.
3. The method as claimed in claim 2,
  wherein the matrix is a plant tray.

4. The method as claimed in claim 2,
wherein the transferring of the mixture of binder composition and planting substrate to the matrix is carried out with application of pressure.

5. The method as claimed in claim 2,
wherein the transferring of the mixture of binder composition and planting substrate to the matrix is carried out without pressure.

6. The method as claimed in claim 1,
wherein the binder composition comprises the dispersion medium or solvent in amounts of from 60 to 99.9 wt %, based on the binder composition.

7. The method as claimed in claim 1,
wherein the binder composition comprises the adhesive in amounts of from 0.05 to 40 wt %, based on the binder composition.

8. The method as claimed in claim 1,
wherein the binder composition has a Brookfield viscosity at 20° C. in the range of from 50 to 1,000 mPas.

9. The method as claimed in claim 1,
wherein the binder composition is sprayable.

\* \* \* \* \*